United States Patent [19]

Kubik

[11] Patent Number: 4,458,497
[45] Date of Patent: Jul. 10, 1984

[54] METHOD AND DO-IT-YOURSELF KIT FOR EVACUATING AN AIR CONDITIONING UNIT

[76] Inventor: James S. Kubik, 4858 Tillamook Trail, Lima, Ohio 45805

[21] Appl. No.: 431,129

[22] Filed: Sep. 30, 1982

[51] Int. Cl.³ .............................................. F25B 45/00
[52] U.S. Cl. ......................................... 62/77; 62/149; 62/292
[58] Field of Search ................... 62/77, 149, 174, 239, 62/323.1, 475, 292; 141/65

[56] References Cited

U.S. PATENT DOCUMENTS 3,237,420 3/1966 Mulholland ...................... 62/149 X
3,916,641 11/1975 Mullins .............................. 62/77 X
3,935,713 2/1976 Olson ...................................... 62/77
3,996,765 12/1976 Mullins ............................... 62/77 X Primary Examiner—Lloyd L. King
Attorney, Agent, or Firm—Michael J. Delaney

[57] ABSTRACT

A method of evacuating an air conditioner utilizes the vacuum from the air/fuel manifold of a gasoline internal combustion engine. A do-it-yourself kit for so evacuating an air conditioner includes a hose so constructed as to allow one end to fit the Schrader valve on the discharge side of the air conditioner and the other end to fit a variety of sizes of tube members which extend from the air/fuel intake manifold, for example, the tube member which is connected to the positive crankcase ventilation (PCV) valve. The hose includes a one way valve which prevents flow into the compressor of the unit but permits flow out of the compressor.

4 Claims, 3 Drawing Figures

METHOD AND DO-IT-YOURSELF KIT FOR EVACUATING AN AIR CONDITIONING UNIT

BACKGROUND OF THE INVENTION

This invention relates generally to the evacuation of the refrigerant chambers of an air conditioner unit and more specifically to a method and a do-it-yourself kit for evacuating an air conditioning unit by using the air/fuel intake manifold of a gasoline internal combustion engine.

A substantial number of air conditioning units are in use today. A sizeable percentage of all automobiles and houses have air conditioners. From time to time, these air conditioners may require the replacement of their refrigerant. In order to do so, all refrigerant, air and moisture must be removed from the air conditioning system prior to recharging the system with new refrigerant.

Heretofore, the do-it-yourself person when faced with the problem of evacuating an air conditioning system had two alternatives. One, the person could present the system to a professional repair station which had the required equipment to solve the problem. Two, the person could purchase at great expense a vacuum pump and related equipment suitable to solve the problem. Both alternatives are costly.

The present invention gives the do-it-yourself person another alternative which is by far less costly than the heretofore available alternatives.

SUMMARY OF THE INVENTION

A method of evacuating an air conditioner in accordance with this invention comprises venting the refrigerant from the air conditioner, connecting one end of a hose in communication with the discharge side of the compressor of the air conditioner and the other end of the hose in communication with the air/fuel intake manifold of an internal combustion engine, operating the motor which drives the compressor, operating the internal combustion engine so that the vacuum from the air/fuel intake manifold evacuates the air and water from the air conditioner. During evacuation, the speed of the internal combustion engine is increased quickly and then abruptly decreased a number of times.

The do-it-yourself kit of this invention includes a hose for connection to the compressor and to the air/fuel intake manifold. The hose has at one end a threaded connection and a detent for attachment to the Schrader valve of the compressor. At the other end of the hose is a coupling means including a plurality of integral portions adapted to receive tube members having different diameters. The hose also includes a one way valve which permits flow out of the compressor but prevents flow into the compressor.

DETAILED DESCRIPTION OF THE DRAWINGS

Figure 1:
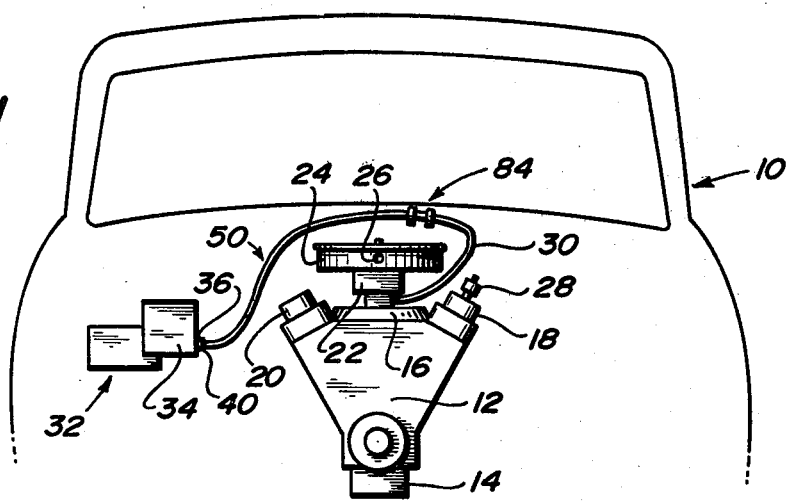
FIG. 1 is a schematic illustration of this invention using an automobile internal combustion engine to evacuate an automobile air conditioner.

Referring to FIG. 1, 10 indicates an automobile having a gasoline internal combustion engine 12 of the V-8 type. It will be appreciated that a gasoline V-8 type engine is used for illustration purposes and this invention can be used with internal combustion engines of other types. The engine 12 includes a crankcase 14 and a fuel/air intake manifold 16. Valve covers 18 and 20 are located over the engine heads with each valve cover in communication with crankcase 14. Located above air/fuel intake manifold 16 is a carburetor 22 and located above carburetor 22 is an air filter housing 24. Air inlet tube 26 is in communication with air filter housing 24. Extending through valve cover 18 and in communication with the space immediately therebelow is a positive crankcase ventilation (PCV) valve 28 of a type well known to those skilled in the art of internal combustion engines. In the ordinary mode of operation, tube member 30 is connected to and extends between fuel/air intake manifold 16 and PCV valve 28.

Most modern day automobiles are equipped with a positive crankcase ventilation system. The crankcase ventilation system receives its air through the air filter housing inlet 26 and the air passes through a tube (not shown) to the valve cover 20. The air passes through a filter (not shown) and into the crankcase 14 where it mixes with the crankcase vapors. The vapors are then drawn through the PCV valve 28 located in the valve cover 18. The vapors then pass through tube 30 to the base of the carburetor 22, or alternatively, to the intake manifold 16, and into the engine 12 where they are burned.

Numeral 32 indicates generally an automobile air conditioner having a belt driven compressor unit 34. As is well known in the art, the air conditioner 32 is mounted under the hood of the automobile 10 adjacent to internal combustion engine 12.

Figure 2:
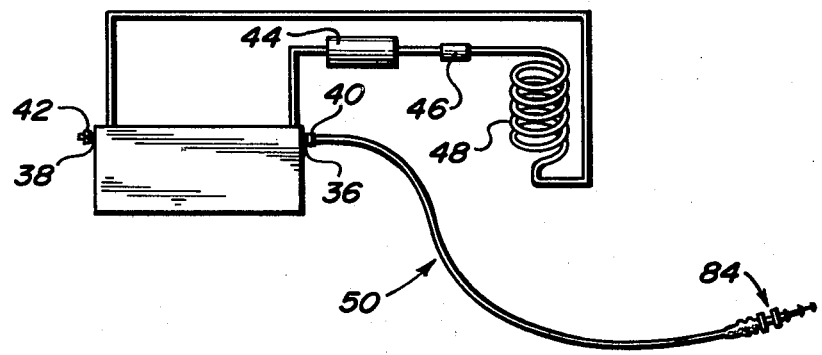
FIG. 2 is a schematic illustration of an air conditioning system.

Referring to FIG. 2, the refrigeration system illustrated is the conventional air conditioning system, generally indicated by numeral 32. The system 32 includes a belt driven compressor unit 34 having a discharge or high pressure side 36 and an inlet or low pressure side 38. As is well known in the art, a Schrader valve 40 is provided in the high pressure side 36 and a Schrader valve 42 is provided in the low pressure side 38. Low pressure refrigerant is drawn into compressor unit 34 at its low pressure side 38 where it is compressed to a high pressure, high temperature vapor and forced into condensor 44. In the condensor 44 the vaporized refrigerant is changed to a high pressure, high temperature liquid as its latent heat is drawn through the condensor 44 by the engine fan (not shown). The high pressure, high temperature liquid from the condensor 44 is then forced into the expansion valve 46 on the evaporator assembly. The high pressure liquid then changes to a low pressure liquid and vapor as it forces its way through the valve 46 into the inlet pipe of the evaporator 48. In the evaporator 48 some of the heat from the air circulating in the air conditioning system is given up to the cold evaporator tubes, causing the liquid refrigerant to vaporize. The refrigerant vapor is drawn into the low pressure side 38 of the belt driven compressor 34, where the cycle is repeated.

Figure 3:
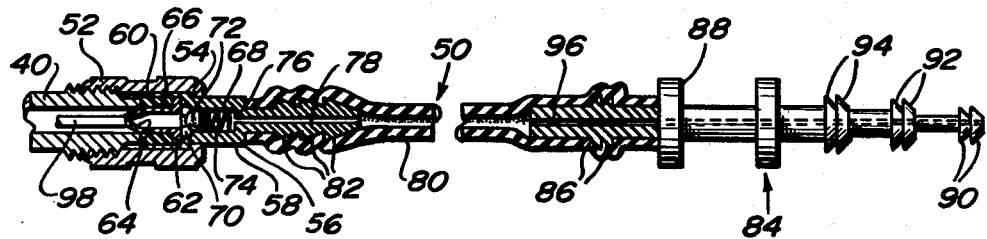
FIG. 3 is a plan view, partly in section, of the apparatus of this invention connected to the Schrader valve of an air conditioner compressor.

When for any reason, such as for example, a damaged line, the system must be evacuated of all atmospheric air and moisture, the hose 50 shown in FIG. 3 is placed between and connected to the discharge side 36 of the compressor unit 34 and the tube member 30 which is connected to the air/fuel intake manifold 16, as shown in FIG. 1.

Hose 50 has at one end a threaded connector having an internally threaded cap 52 with an inwardly extending shoulder 54 for engagement with an outwardly extending shoulder 56 on body 58 of threaded connector. Body 58 at its outward end has an enlarged opening 60 of a diameter to receive the base portion 62 of detent 64. Detent 64 is in the shape of a loop as opposed to a solid cylinder. This loop shape allows gas to flow through detent 64, when cap 52 is threaded onto Schrader valve 40 causing detent 64 to bear against stem 98 and move stem 98 to the open position. Sleeve 66 made from a plastic or rubber like material fits over detent 64 within body 58. Positioned between base portion 62 and reduced opening 68 in body 58 is an O-ring 70. Ball 72 is positioned within reduced opening 68 and held against O-ring 70 by compression spring 74 which bears against the inwardly extending shoulder 76 of body 58 and ball 72. Passageway 78 extends thru body 58 to the enlarged opening 60 of body 58. Connected to the free end of body 58 is a hose 80 which fits around and is held to body 58 by annular ring like, saw toothed portions 82 which are integral with body 58.

The other end of hose 80 has a coupling means 84 which is partly within hose 80 and is held to hose 80 by integral ring like, saw toothed portions 86. Hose 80 has its end in contact with enlarged annular ring like, shoulder portion 88. The outward end of coupling means 84 includes three annular ring like, saw toothed portions 90, 92, 94 of different diameters. The saw toothed portion 90 having the smallest diameter, the saw toothed portion 92 being larger and the diameter of saw toothed portion 94 being the largest. Thus portions 90, 92, 94 allow hose 80 to be tightly attached to different size tube members 30 which extend from air/fuel intake manifold 16. A passageway 96 extends through coupling means 84.

PREFERRED EMBODIMENT

When an air conditioning unit is to be evacuated in preparation for recharging it with refrigerant, the following procedure should be followed:

With both the belt driven compressor unit 34 and the engine 12 off and while wearing safety glasses, carefully depress the stem of Schrader valve 40 located on the discharge side of belt driven compressor unit 34 until all gas is vented from the air conditioner and the pressure within the air conditioner is about equal to atmospheric pressure.

Next connect cap 52 of hose 50 to Schrader valve 40 of high pressure side 36 of belt driven compressor unit 34 such that detent 64 opens stem 98 of Schrader valve 40. Also pass tube member 30 over the appropriate annular ring like, saw toothed portion 90, 92, 94 depending on the inside diameter of tube member 30.

Next start engine 12 and allow it to idle for about five minutes. The idling speed (minimum) is about 450 RPM for all internal combustion engines. A V-8 type engine idles at about 550 to 750 RPM; a six cylinder engine idles at about 625 to 900 RPM; and a four cylinder engine at about 700 to 1200 RPM. Therafter start the air conditioner 32 and set all controls to provide maximum cooling. Quickly increase the speed of engine 12 to about 2500 RPM and then abruptly decrease the speed of the engine to idle. Repeat the quick increase of the engine speed and the abrupt decrease at least three times. The air conditioning unit should be completely evacuated of all air and moisture.

The above procedure performs best at maximum intake manifold vacuum. Maximum vacuum is acheived by accelerating the automobile in low gear and thereafter abruptly releasing the automobile throttle and allowing the automobile to decelerate.

If the air conditioner is contaminated with water, the moisture can be removed by maintaining air/fuel intake manifold vacuum on the unit for about twenty-four hours. Once the vacuum has been established, the engine 12 need not operate continuously for the twenty-four hour period. However, for best results, the engine should operate for the last thirty to sixty minutes of the twenty-four hour period. Best moisture extraction can be achieved by driving the automobile for about thirty minutes while the hose 50 is connected to the intake manifold 16 and the discharge side 36 of the compressor 34. By so doing the under hood temperature reaches in excess of 130 degrees F. and this increased temperature aids in removing moisture from the air conditioner 32.

Although I have described my invention hereinabove in considerable detail, I do not wish to be limited narrowly to the exact and specific particulars disclosed, but may also use such substitutes, modifications, and equivalents as are included within the scope and spirit of this invention.

I claim:

1. A method of evacuating an air conditioning unit of an automobile comprising the steps of
    (a) venting refrigerant gas from the air conditioning unit,
    (b) placing one end of a hose in communication with the discharge side of the compressor of the air conditioning unit and the other end of the hose in communication with the fuel/air intake manifold of an internal combustion engine of said automobile,
    (c) operating the compressor, and
    (d) operating the internal combustion engine until the under hood temperature is in excess of about 130 degrees F. whereby the vacuum from the fuel/air intake manifold evacuates gas and moisture from the air conditioning unit.

2. The method of claim 1 wherein during the operation of the internal combustion engine under step (d) the speed in revolutions per minute of the engine is increased substantially and thereafter abruptly decreased.

3. The method of claim 2 wherein the speed of the engine is so increased and decreased at least three times.

4. A do-it-yourself kit for evacuating an air conditioning unit of an automobile comprising a hose, a threaded connector on one end of the hose for connection with a Schrader valve located on the discharge side of the compressor of said unit, said connector containing a one way valve to permit flow into said hose but to prevent flow from said hose into said compressor, said threaded connector containing a detent to open said Schrader valve, a coupling means on the other end of said hose, said coupling means including a plurality of integral portions of different diameters to enable said coupling means to be coupled to tube members of different diameters extending from the fuel/air intake manifold of an internal combustion engine of said automobile, wherein the under hood temperature is in excess of about 130 degrees F.

* * * * *